(12) United States Patent
Miura et al.

(10) Patent No.: US 8,042,834 B2
(45) Date of Patent: Oct. 25, 2011

(54) FRONT STRUCTURE OF VEHICLE

(75) Inventors: Noriyuki Miura, Fujisawa (JP); Kouichi Tsuyama, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 140 days.

(21) Appl. No.: 12/516,138

(22) PCT Filed: Nov. 27, 2007

(86) PCT No.: PCT/JP2007/072860
§ 371 (c)(1),
(2), (4) Date: May 22, 2009

(87) PCT Pub. No.: WO2008/066041
PCT Pub. Date: Jun. 5, 2008

(65) Prior Publication Data
US 2010/0066126 A1 Mar. 18, 2010

(30) Foreign Application Priority Data
Nov. 27, 2006 (JP) .................................. 2006-319232

(51) Int. Cl.
*B62D 21/02* (2006.01)
*B62D 21/15* (2006.01)
(52) U.S. Cl. .... 280/784; 280/781; 280/800; 296/187.09
(58) Field of Classification Search ............... 180/232, 180/311; 280/781, 784, 796, 800; 296/187.09, 296/193.05, 193.09; *B62D 21/02, 21/15*
See application file for complete search history.

(56) References Cited

U.S. PATENT DOCUMENTS

| | | | | |
|---|---|---|---|---|
| 1,493,736 A * | 5/1924 | Collins | ......................... | 280/796 |
| 2,901,266 A * | 8/1959 | Lindsay | ........................ | 280/785 |
| 3,848,886 A * | 11/1974 | Feustel et al. | ................ | 280/784 |
| 3,912,295 A * | 10/1975 | Eggert, Jr. | ...................... | 280/784 |
| 5,308,115 A * | 5/1994 | Ruehl et al. | .................. | 280/785 |
| 5,480,189 A * | 1/1996 | Davies et al. | ................. | 280/797 |
| 5,496,067 A * | 3/1996 | Stoll et al. | ..................... | 280/784 |
| 5,718,048 A * | 2/1998 | Horton et al. | ................ | 29/897.2 |
| 5,741,026 A * | 4/1998 | Bonnville | ...................... | 280/781 |
| 6,293,587 B1 * | 9/2001 | Lapic et al. | .................. | 280/784 |
| 6,312,028 B1 * | 11/2001 | Wilkosz | ....................... | 293/133 |
| 6,398,260 B1 * | 6/2002 | Rinehart | ...................... | 280/781 |
| 6,733,040 B1 * | 5/2004 | Simboli | ....................... | 280/800 |
| 6,893,078 B2 * | 5/2005 | Saeki | ....................... | 296/187.09 |
| 7,216,924 B2 * | 5/2007 | Li et al. | .................... | 296/187.12 |
| 7,261,322 B2 * | 8/2007 | Ito et al. | ....................... | 280/781 |

(Continued)

FOREIGN PATENT DOCUMENTS

EP 1241078 A1 * 9/2002

(Continued)

*Primary Examiner* — Toan C To
*Assistant Examiner* — Laura Freedman

(57) ABSTRACT

Provided is a front structure of a vehicle 1, and the front structure includes a pair of side frames 2 and a first cross member 31. The pair of side frames 2 are disposed respectively on both sides of the vehicle in a vehicle-width direction and extend in a front-to-rear direction. The first cross member extends in the vehicle-width direction, and connects front-end portions 25 of the pair of side frames 2. Each of the front-end portions 25 of the side frames 2 includes a protruding portion 26 that extends frontwards integrally thereof beyond the first cross member 31. In the event of a frontal collision of the vehicle 1, the protruding portions 26 absorb the produced energy, so that the amount of deformation of portions respectively of the side frames 2 located at rear sides of the front-end portions 25 can be reduced.

4 Claims, 5 Drawing Sheets

U.S. PATENT DOCUMENTS

| | | | |
|---|---|---|---|
| 7,325,866 B2 * | 2/2008 | Horton et al. | 296/205 |
| 2006/0208534 A1 * | 9/2006 | Regnell et al. | 296/187.09 |
| 2010/0060033 A1 * | 3/2010 | Miura et al. | 296/190.05 |

FOREIGN PATENT DOCUMENTS

| | | | | |
|---|---|---|---|---|
| JP | 03-077785 U | | | 8/1991 |
| JP | 06024355 A | * | | 2/1994 |
| JP | 06-270839 A | | | 9/1994 |
| JP | 11180336 A | * | | 7/1999 |
| JP | 2000-177626 A | | | 6/2000 |
| JP | 2000-203451 A | | | 7/2000 |
| JP | 2001233238 A | * | | 8/2001 |
| JP | 2001260938 A | * | | 9/2001 |
| JP | 2003335260 A | * | | 11/2003 |

* cited by examiner

1

FRONT STRUCTURE OF VEHICLE

TECHNICAL FIELD

The present invention relates to a front structure of a vehicle.

BACKGROUND ART

In the event of a frontal collision of a vehicle against a rigid barrier (hereinafter referred to as a barrier), the kinetic energy is absorbed by effectively deforming a chassis frame that hits the barrier, so that a survival space can be secured and the safety of the occupants can be thus improved.

JP-A-2000-203451 discloses a structure in which inner reinforcements are fixed respectively to a pair of side-member bodies which extend in a front-to-rear direction and each of which has an inflecting portion formed in a middle portion thereof. Each of the inner reinforcements has a variable cross-sectional structure which provides approximately uniform cross-sectional stiffness to the corresponding side-member body.

Patent Document 1: JP-A-2000-203451

DISCLOSURE OF THE INVENTION

Problems to be Solved by the Invention

For the improvement in the occupants' safety, it is preferable that, in the event of a collision of a vehicle, the energy of the inputted load be absorbed at a position that is away from the seat positions of the occupants.

With a uniform cross-sectional stiffness such as one that the side-member body of the above structure has, however, the energy of the load caused by a collision may not be absorbed only sufficiently at a position that is away from the seat positions of the occupants.

The present invention is made in view of the above circumstance. An object of the present invention is therefore to provide a front structure of a vehicle capable of efficiently absorbing the energy produced in the event of a frontal collision of the vehicle.

Means for Solving the Problems

To achieve the above object, a first aspect of the present invention provides a front structure of a vehicle that includes a pair of side frames, and a first cross member. The pair of side frames are located respectively on both sides of the vehicle in a vehicle-width direction and extend in a front-to-rear direction. The first cross member extends in the vehicle-width direction and connects front-end portions respectively of the pair of side frames. Each of the front-end portions of the side frames includes a protruding portion that extends frontwards integrally therefrom beyond the first cross member.

According to the above configuration, each of the front-end portions of the side frames includes the protruding portion that extends frontwards integrally therefrom beyond the first cross member. Accordingly, in the event of a frontal collision of the vehicle, deformation of the protruding portions absorbs the produced energy. As a consequence, deformation of the portions of the side frames located at rear sides of the front-end portions can be reduced.

A second aspect of the present invention provides the front structure of a vehicle according to the first aspect that includes a second cross member. The second cross member is placed at a rear side of the first cross member, and extends in the vehicle-width direction to connect the pair of side frames. In each of the side frames, a first area located between the first cross member and the second cross member has higher strength than the corresponding protruding portion. The first area is more difficult to be deformed, than the protruding portion when a load is inputted from a front side into the corresponding front-end portion.

According to the above configuration, in the event of a frontal collision of the vehicle, deformation of the protruding portions and deformation of the first areas absorb the produced energy. In addition, since the first areas are more difficult to be deformed than the protruding portions, deformation of the protruding portions is likely to progress faster than deformation of the first areas. Accordingly, the energy can be absorbed efficiently by portions located away from the first areas, and thus the safety for a section of the cabin space above the first areas can be improved.

A third aspect of the present invention provides the front structure of a vehicle according to the second aspect that includes a third cross member. The third cross member is placed at a rear side of the second cross member, and extends in the vehicle-width direction to connect the pair of side frames. In each of the side frames, a second area located between the second cross member and the third cross member has higher strength than the corresponding first area. The second area is more difficult to be deformed, than the first area when a load is inputted from a front side into the corresponding front-end portion.

According to the above configuration, in the event of a frontal collision of a vehicle, deformation of the protruding portions, deformation of the first areas, and deformation of the second areas absorb the produced energy. In addition, since the second areas are more difficult to be deformed than the first areas, deformation of the first portions is likely to progress faster than deformation of the second areas. Moreover, since the first areas are more difficult to be deformed than the protruding portions, deformation of the protruding portions is likely to progress faster than deformation of the first areas. Accordingly, the energy can be absorbed efficiently by portions located away from the second areas, and thus the safety for a section of the cabin space above the second areas can be improved.

A fourth aspect of the present invention provides the front structure of a vehicle according to any one of the first to the third aspects. Each of the side frames includes: a side member that extends in the front-to-rear direction; and an inner reinforcement that is fixed to the side member. The inner reinforcement includes a bulging portion formed in a part thereof at a position in the front-to-rear direction.

According to the above configuration, in each side frame, a portion where the inner reinforcement is provided to the side member has higher strength. Accordingly, a simple configuration including the providing of the inner reinforcements respectively to the side members can make each of the side frames have a portion with different strength.

In addition, of the portion where each of the side members is provided with the inner reinforcement, a portion of the side frame provided with the bulging portion of the inner reinforcement has even higher strength. Accordingly, higher strength can be achieved by forming a bulging portion in a desired portion of the side frame, for example, in a portion where a heavy object is attached.

Effects of the Invention

According to the present invention, the energy produced by a frontal collision can be absorbed efficiently.

Figure 1:
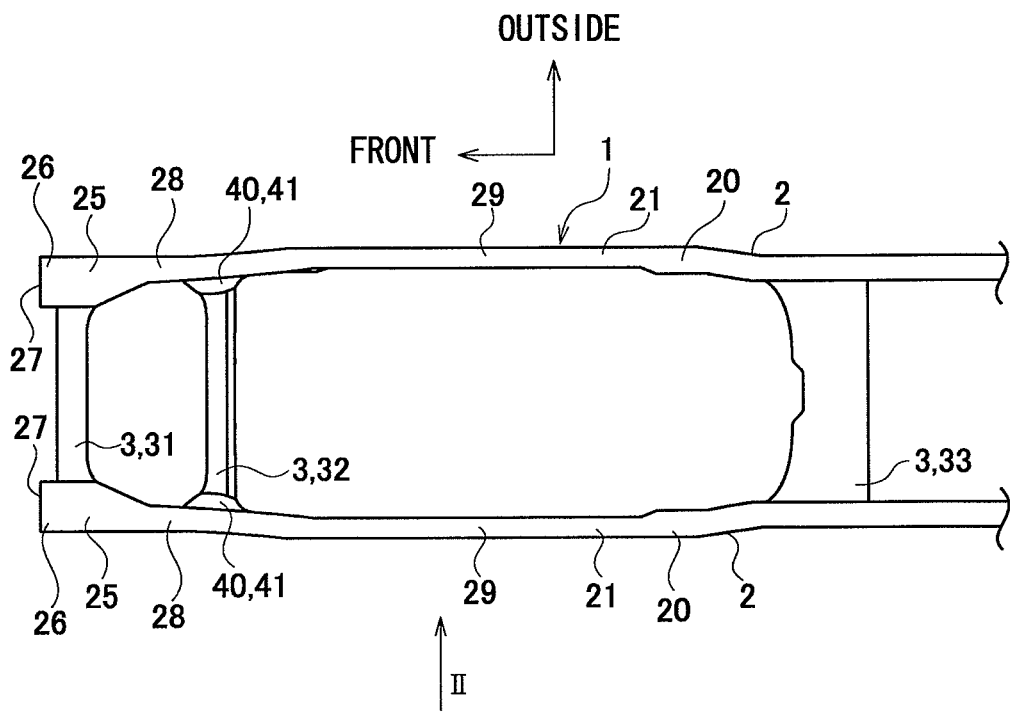
FIG. 1 is a plan view illustrating a front structure of a vehicle according to an embodiment.

EXPLANATION OF REFERENCE NUMERALS 1 vehicle
2 side frame
3 cross member
20 side member
25 front-end portion
26 protruding portion
28 first area
29 second area
31 first cross member
32 second cross member
33 third cross member
40 inner reinforcement
47 bulging portion

BEST MODE FOR CARRYING OUT THE INVENTION

An embodiment of the present invention will be described below with reference to the drawings.

Figure 2:
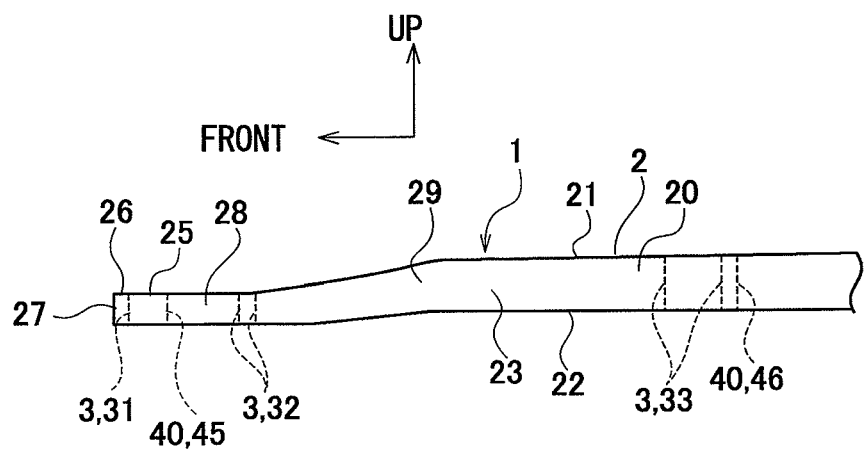
FIG. 2 is a side elevation viewed as indicated by the arrow II of FIG. 1.
Figure 3:
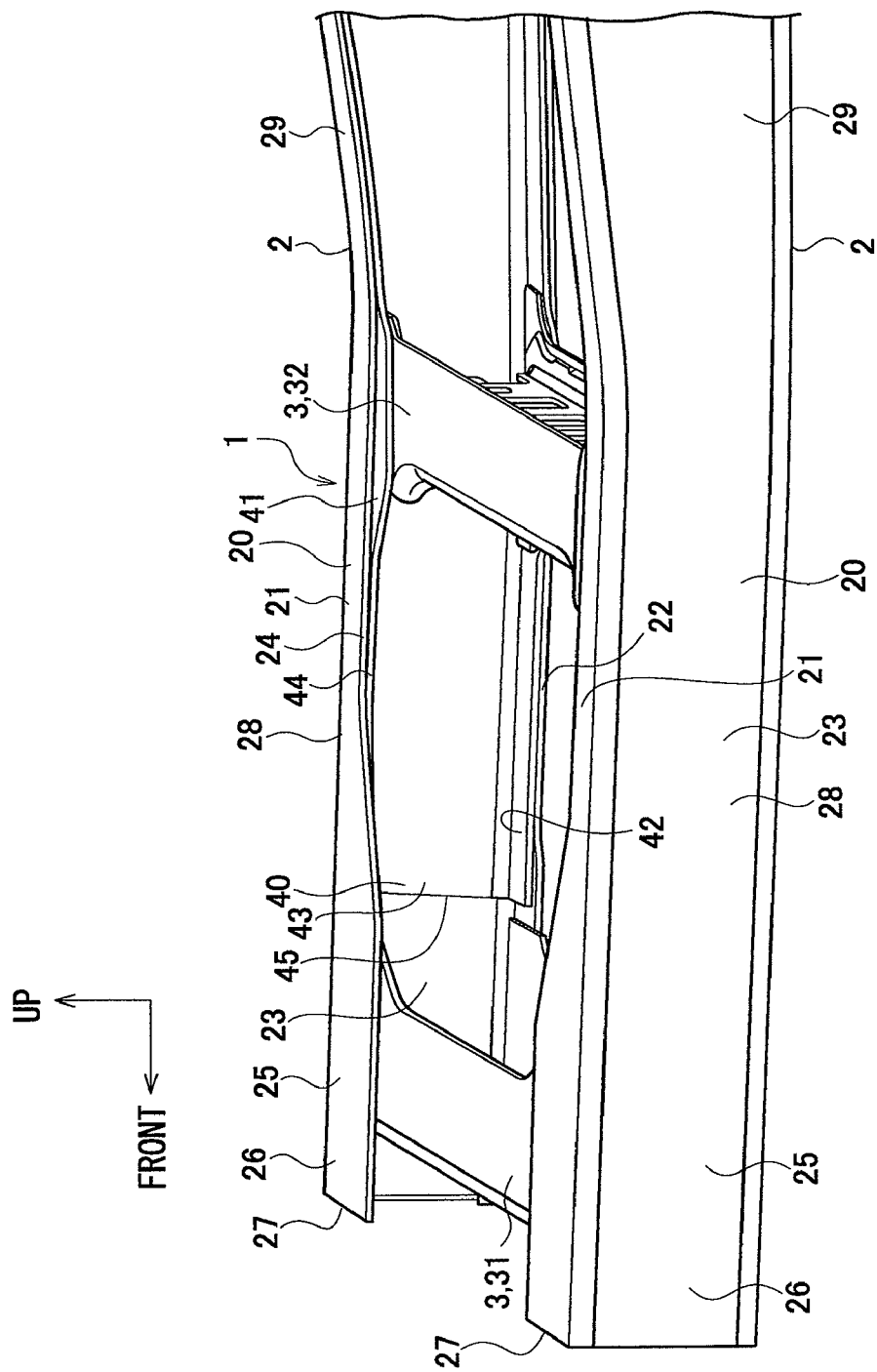
FIG. 3 is a perspective view illustrating a principal portion of FIG. 1 including a first cross member and a second cross member.
Figure 4:
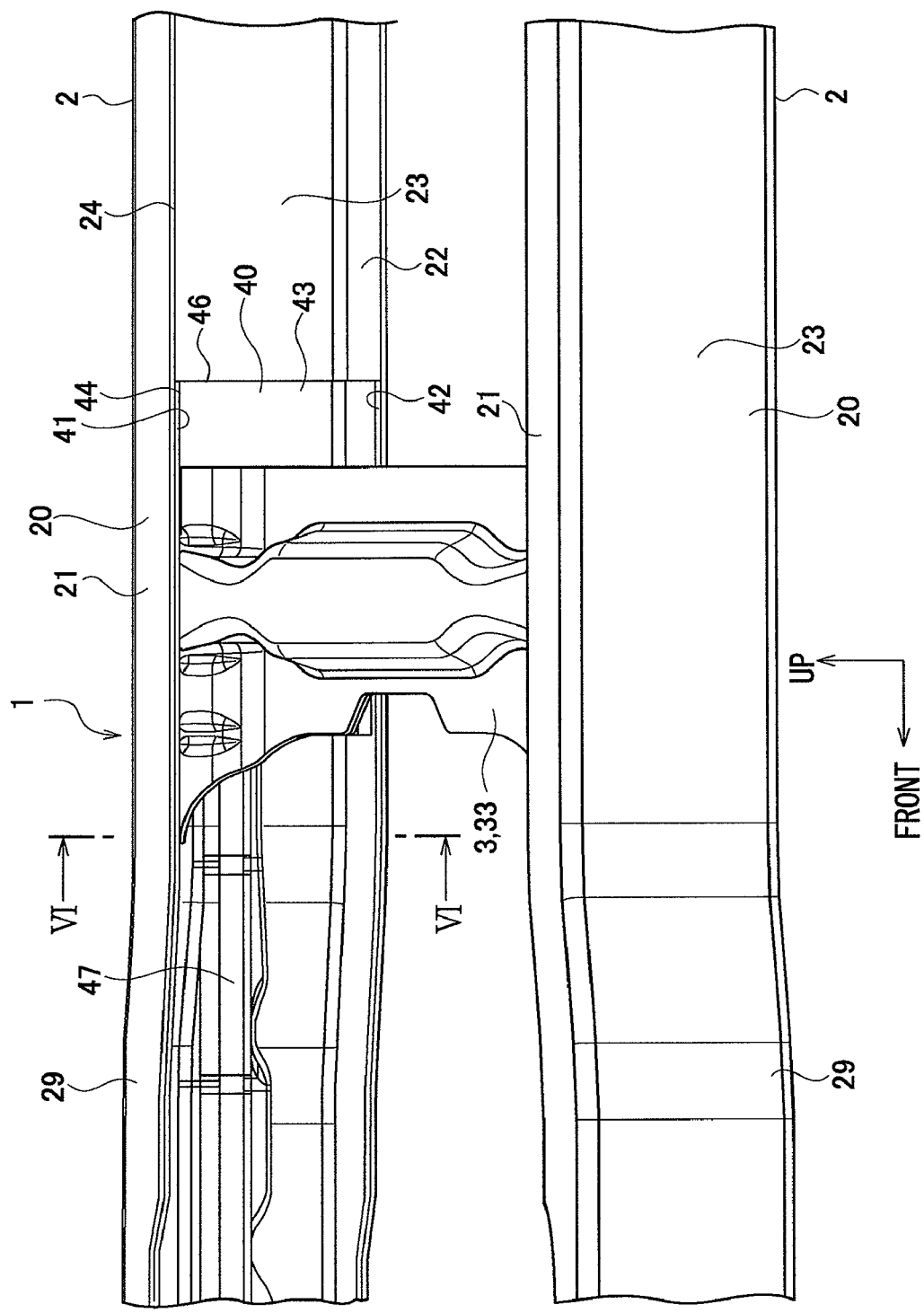
FIG. 4 is a perspective view illustrating a principal portion of FIG. 1 including a third cross member.
Figure 5:
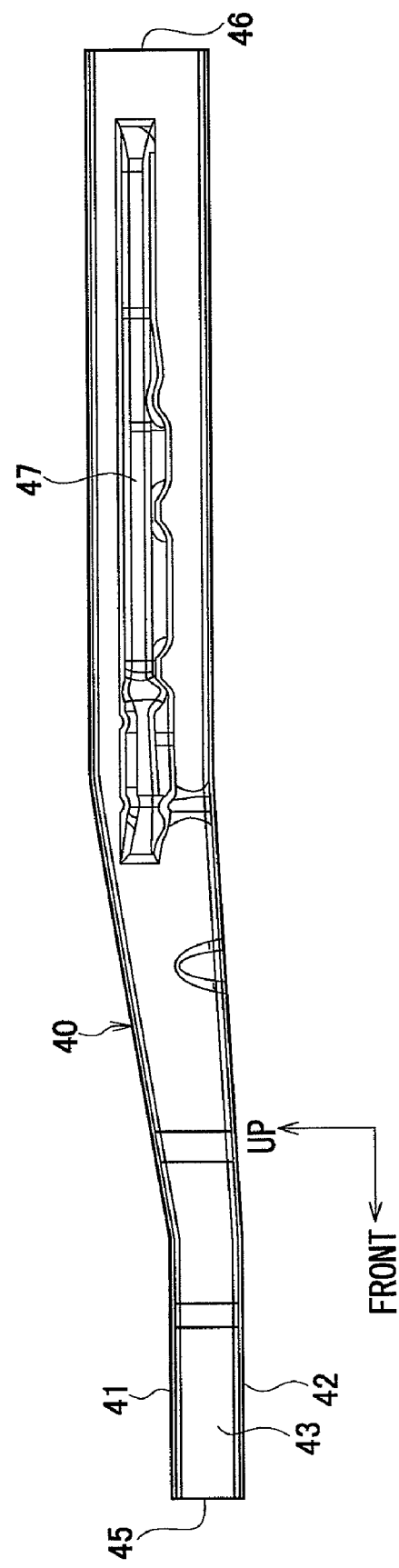
FIG. 5 is a side elevation illustrating an inner reinforcement of a side frame according to the embodiment.
Figure 6:
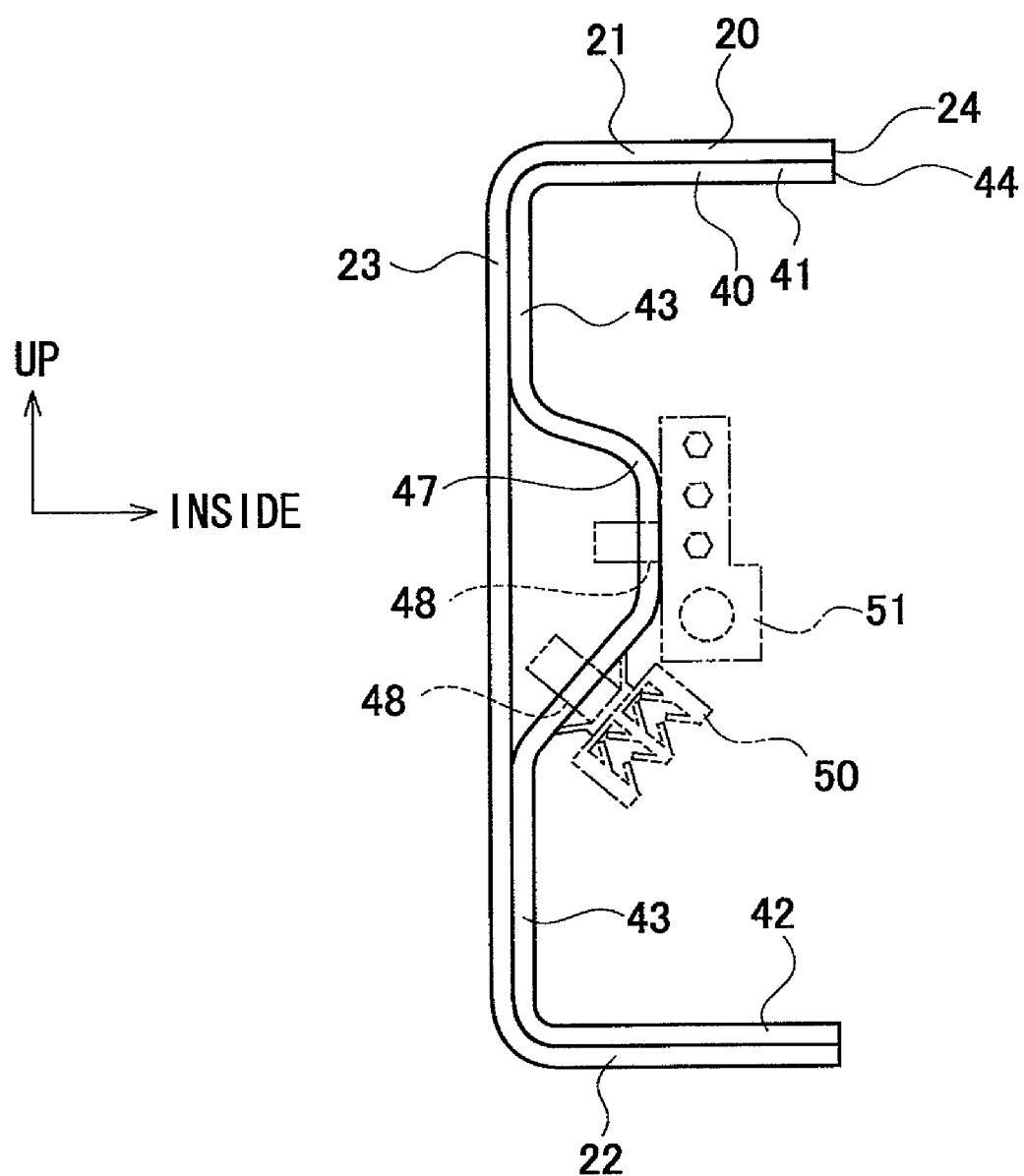
FIG. 6 is a cross-sectional view taken along and viewed as indicated by the arrowed line VI-VI of FIG. 4.

FIG. 1 is a plan view illustrating a front structure of a vehicle according to the embodiment. FIG. 2 is a side elevation viewed from a direction indicated by the arrow II of FIG. 1. FIG. 3 is a perspective view illustrating a principal portion of FIG. 1 including a first cross member and a second cross member. FIG. 4 is a perspective view illustrating a principal portion of FIG. 1 including a third cross member. FIG. 5 is a side elevation illustrating an inner reinforcement for a side frame according to the embodiment. FIG. 6 is a cross-sectional view taken along and viewed as indicated by the arrowed line VI-VI of FIG. 4. Note that a front-to-rear direction mentioned in the following description indicates a front-to-rear direction with respect to an advancing direction of a vehicle 1. In addition, the arrow "FRONT" in the drawings indicates a frontward direction of the vehicle while the arrow "UP" indicates an upward direction of the vehicle. The arrow "INSIDE" indicates an inward vehicle-width direction while the arrow "OUTSIDE" indicates an outward vehicle-width direction.

As FIGS. 1 to 6 show, the vehicle 1 of this embodiment has a front structure that includes a pair of side frames 2 and plural cross members 3. The side frames 2 extend in the front-to-rear direction, and are provided respectively on both sides of the vehicle in the vehicle-width direction. Each of the plural cross members 3 connects the pair of side frames 2.

A first cross member 31, which is one of the cross members 3, has a substantially U-shaped cross section with its opening facing rearwards, and extends in the vehicle-width direction. A second cross member 32, which is another one of the cross members 3, has a closed rectangle cross section, and extends in the vehicle-width direction. A third cross member 33, which is the other of the cross members 3, has a closed cross section, and extends in the vehicle-width direction.

Each of the side frames 2 includes a side member 20 and an inner reinforcement 40.

Each of the side members 20 is formed as a unitary body including an upper plate 21, a lower plate 22, and a vertical plate 23. The upper plate 21 and the lower plate 22 are arranged so as to face each other, and are connected each other by the vertical plate 23. Each side member 20 has a substantially U-shaped cross section with an opening 24 facing inwards in the vehicle-width direction, and extends in the front-to-rear direction. The pair of side members 20 respectively have front-end portions 25 both connected to the first cross member 31. Each of the front-end portions 25 includes a protruding portion 26 that extends integrally therefrom frontwards beyond the first cross member 31. The protruding portions 26 of the pair of side members 20 include front-end edges 27, respectively, and both of the front-end edges 27 are connected to a bumper (not illustrated). To the second cross member 32, each of the pair of side members 20 is connected at a portion thereof located a certain distance away rearwards from the corresponding front-end portion 25. To the third cross member 33, the pair of side members 20 is connected at a portion thereof located a certain distance away rearwards from the portion connected to the second cross member 32. In a portion located at a rear side of the portion connected to the second cross member 32, each side member 20 has a larger vertical width, and each lower plate 22 is positioned at a slightly higher level. In addition, the inner reinforcements 40 are fixed to the respective side member 20.

Each of the inner reinforcements 40 is placed along an inner-side surface of the corresponding side member 20. Each inner reinforcement 40 is formed as a unitary body including an upper plate 41, a lower plate 42, and a vertical plate 43. The upper plate 41 and the lower plate 42 are arranged so as to face each other, and are connected each other by the vertical plate 43 with an opening 44 facing inwards in the vehicle-width direction. Each inner reinforcement 40 has a front-end portion 45 located at a rear side of the portion of the corresponding side member 20 and the first cross member 31, and has a rear-end portion 46 located at a rear side of the connecting portion of the corresponding side member 20 and the third cross member 33. The upper plate 41 and the lower plate 42 of each inner reinforcement 40 are laid on and fixed to the upper plate 21 and the lower plate 22 of the corresponding side member 20, respectively. In a portion, in the front-to-rear direction, of the vertical plate 43 of each inner reinforcement 40, a bulging portion 47 protruding inward in the vehicle-width direction from the corresponding side member 20 is provided. Assume that the vertical plate 43 of each inner reinforcement 40 is divided vertically and almost equally into three sections. Then, the bulging portion 47 protrudes from the middle one of the above three sections. The protruding length of the bulging portion 47 is approximately equal to a third of the width, in the vehicle-width direction, of the upper plate 41 of the inner reinforcement 40. Accordingly, even in the portion where the bulging portion 47 is provided, a certain space can be secured inside each side frame 2. The above-described structure allows such members as a clip 50 for fixing a harness and a clip 51 for fixing a pipe to be attached respectively to plural attachment holes 48 formed in each of the inner reinforcements 40. Note that, in this embodiment, the portion where the bulging portion 47 is formed is where a suspension is to be attached.

In this embodiment, the front-end portion 25 of each side frame 2 includes the protruding portion 26 that extends integrally therefrom frontwards beyond the first cross member 31. Accordingly, in the event of a frontal collision of the vehicle 1, the protruding portions 26 absorb the energy caused by the frontal collision, and thus reduce the amount of deformation of a portion of each side frame 2 located at the rear side of the front-end portion 25.

In each side frame 2, each of the inner reinforcements 40 is provided in a first area 28 that is located between the first cross member 31 and the second cross member 32. Accordingly, the first area 28 has higher strength than the protruding portion 26, and thus is more difficult, than the protruding portion 26, to be deformed by the inputting of a load, from the front side, into the front-end portion 25. In the event of a frontal collision of the vehicle 1, deformation of the protruding portion 26 and deformation of the first area 28 absorb the energy produced by the collision. In addition, since the first area 28 is more difficult to be deformed than the protruding portion 26, deformation of the protruding portion 26 progresses faster than deformation of the first area 28. Accordingly, the energy can be absorbed efficiently by portions located away from first areas 28, whereby the safety for a section of the cabin space formed above the first areas 28 can be improved.

In each side frame 2, a second area 29 that is located between the second cross member 32 and the third cross member has a larger vertical width than the first area 28. Accordingly, the second area 29 has higher strength than the first area 28 and thus is more difficult, than the first area 28, to be deformed by the inputting of a load, from the front side, into the front-end portion 25. In the event of a frontal collision of the vehicle 1, deformation of the protruding portion 26, deformation of the first area 28, and deformation of the second area 29 absorb the energy produced by the collision. In addition, since the second area 29 is more difficult to be deformed than the first area 28, deformation of the first area 28 progresses faster than deformation of the second area 29. Moreover, since the first area 28 is more difficult to be deformed than the protruding portion 26, deformation of the protruding portion 26 progresses faster than deformation of the first area 28. Accordingly, the energy can be absorbed by portions located away from the second areas 29, whereby the safety for a section of the cabin space formed above the second areas 29.

In addition, for the purpose of providing each side frame with a portion having different strength, the inner reinforcement 40 is arranged on a portion of the side member. Of the portion provided with the inner reinforcement 40, a portion of the side frame 2 provided with the bulging portion 47 of the inner reinforcement 40 has even higher strength. Accordingly, higher strength can be achieved by forming a bulging portion 47 in a desired portion of the side frame 2, for example, in a portion where a heavy object is attached.

Note that the providing of the inner reinforcement 40 and the widening of the vertical width of each side member 20 are proposed by this embodiment as some of the ways of making each of the side frames 2 have gradually increasing strength towards the rear side. Besides, in an alternative configuration, the shape (thickness and the like) of each side member 20 per se may be changed. In addition, the bulging portion 47 of the inner reinforcement 40 may be formed in a shape that extends long in the front-to-rear direction as in the case of this embodiment, or may be formed in spots.

An embodiment of the invention made by the inventor has been described thus far. Though the description and the drawings form parts of the disclosure of the present invention by means of the embodiment, the present invention is limited by neither the description nor the drawings. That is, the scope of the present invention obviously includes all the other embodiments, examples, application techniques, and the like that are implemented by those skilled in the art or the like on the basis of the embodiment described above.

INDUSTRIAL APPLICABILITY

The present invention is suitable for various types of vehicles.

The invention claimed is:

1. A front structure of a vehicle, the front structure comprising:
   a pair of side frames located respectively on both sides of the vehicle in a vehicle-width direction and extending in a front-to-rear direction, each side frame comprising:
      a side member comprising an upper plate, a lower plate which opposes the upper plate, a vertical plate which connects the upper plate and the lower plate, and an opening facing inwards in the vehicle width direction between the upper plate and the lower plate, and
      an inner reinforcement which is fixed to the side member;
   a first cross member extending in the vehicle-width direction and connecting front-end portions respectively of the pair of side frames, the first cross member comprising:
      an upper plate portion which extends in the vehicle-width direction and connects to lower surfaces of the upper plates,
      a lower plate portion which opposes the upper plate portion, extends in the vehicle-width direction, and connects to upper surfaces of the lower plates, and
      a connecting plate which extends in the vehicle-width direction between the upper plate portion and the lower plate portion; and
   a second cross member which is placed at a rear side of the first cross member and extends in the vehicle width direction to connect the pair of side frames;
   wherein each of the front-end portions of the side frames includes a protruding portion that extends integrally therefrom frontwards beyond the first cross member,
   the inner reinforcement extends from a rear side of the first cross member to a rear side of the second cross member and includes a bulging portion protruding inwards in the vehicle width direction behind the second cross member, and
   the upper plate and the lower plate of the side member extend inwards in the vehicle width direction more than the bulging portion.

2. The front structure of a vehicle according to claim 1, wherein, in each of the side frames, a first area located between the first cross member and the second cross member has higher strength than the corresponding protruding portion; and
   the first area is more difficult to be deformed than the protruding portion when a load is inputted from a front side into the corresponding front-end portion.

3. The front structure of a vehicle according to claim 2 further comprising a third cross member placed at a rear side of the second cross member, and extending in the vehicle-width direction to connect the pair of side frames,
   wherein, in each of the side frames, a second area located between the second cross member and the third cross member has higher strength than the corresponding first area; and
   the second area is more difficult to be deformed than the first area when a load is inputted from a front side into the corresponding front-end portion.

4. The front structure of a vehicle according to claim 1, wherein the inner reinforcement comprises:
  an inner upper plate,
  an inner lower plate which opposes the inner upper plate, and
  an inner vertical member which connects the inner upper plate and the inner lower plate to one another; and
  the bulging portion extends in the front-to-rear direction.

* * * * *